(12) United States Patent
Holzinger et al.

(10) Patent No.: US 10,928,637 B2
(45) Date of Patent: Feb. 23, 2021

(54) FASTENING SYSTEM OF A HEAD-UP DISPLAY OF A MOTOR VEHICLE, HEAD-UP DISPLAY FOR A MOTOR VEHICLE, INSTALLATION GAUGE FOR A HEAD-UP DISPLAY OF A MOTOR VEHICLE AND GAUGING METHOD FOR A HEAD-UP DISPLAY OF A MOTOR VEHICLE

(71) Applicant: Dr. Ing. h.c. F. Porsche Aktiengesellschaft, Stuttgart (DE)

(72) Inventors: Ralf Holzinger, Illertissen (DE); Lars Helfer, Heimerdingen (DE); Philip Maerkle, Stuttgart (DE); Felix Brendel, Stuttgart (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 0 days.

(21) Appl. No.: 16/655,358

(22) Filed: Oct. 17, 2019

(65) Prior Publication Data

US 2020/0124861 A1    Apr. 23, 2020

(30) Foreign Application Priority Data

Oct. 17, 2018  (DE) ..................... 10 2018 125 709.0

(51) Int. Cl.
*G02B 27/01* (2006.01)
*G02B 6/28* (2006.01)

(52) U.S. Cl.
CPC ....... *G02B 27/0176* (2013.01); *G02B 6/2848* (2013.01)

(58) Field of Classification Search
CPC .... B60K 23/00; B60R 11/0235; F16M 11/10; F16H 25/20; G02B 27/0176
See application file for complete search history.

(56) References Cited

U.S. PATENT DOCUMENTS

| 2007/0290519 A1 | 12/2007 | Gunther et al. |
| 2012/0213574 A1 | 8/2012 | Graf et al. |
| 2013/0155521 A1* | 6/2013 | Shimada ............ G02B 27/0149 359/633 |

(Continued)

FOREIGN PATENT DOCUMENTS

| DE | 10 2006 025 386 | 1/2011 |
| DE | 10 2016 001 232 | 8/2016 |

(Continued)

*Primary Examiner* — Kevin M Nguyen
(74) *Attorney, Agent, or Firm* — Gerald E. Hespos; Michael J. Porco; Matthew T. Hespos (57) ABSTRACT

A head-up display (1) has a housing (2) with a housing lower part (3) and a housing upper part (4). The housing upper part (4) has a cover pane (5) designed for a projection. The housing (2) can be fastened to a body component (11) via a fastening system (7) that forms a releasable connection both to the housing (2) and to the body component (11). The fastening system (7) has first passage openings (17) for the installation on the housing (2) and second passage openings (19) for the installation on the body component (11). The passage openings (17, 19) are elongated holes that receive pin-shaped fixing elements (8) to achieve the connection to the housing (2) and to the body component (11). An installation gauge for a head-up display and a gauging method for a head-up display also are provided.

17 Claims, 6 Drawing Sheets

(56) References Cited

U.S. PATENT DOCUMENTS

2018/0354366 A1* 12/2018 Yoshimura ............. B60K 35/00
2019/0196193 A1* 6/2019 Chien .................... F16H 25/20

FOREIGN PATENT DOCUMENTS

| EP | 2 420 433 | 10/2017 |
|----|-----------|---------|
| WO | 2017/009177 | 1/2017 |
| WO | 2018/095821 | 3/2018 |

* cited by examiner

FASTENING SYSTEM OF A HEAD-UP DISPLAY OF A MOTOR VEHICLE, HEAD-UP DISPLAY FOR A MOTOR VEHICLE, INSTALLATION GAUGE FOR A HEAD-UP DISPLAY OF A MOTOR VEHICLE AND GAUGING METHOD FOR A HEAD-UP DISPLAY OF A MOTOR VEHICLE

CROSS REFERENCE TO RELATED APPLICATION

This application claims priority under 35 USC 119 to German Patent Appl. No. 10 2018 125 709.0 filed on Oct. 17, 2018, the entire disclosure of which is incorporated herein by reference.

BACKGROUND

Field of the Invention

The invention relates to a head-up display of a motor vehicle and to a fastening system of a head-up display of a motor vehicle. The invention also relates to an installation gauge for a head-up display of a motor vehicle and to a gauging method for a head-up display of a motor vehicle.

Related Art

Head-up displays are known and function to project information onto a windshield and into the field of view of a driver of a motor vehicle so that the driver can maintain his/her viewing direction. The head-up display must be designed and fastened to a body of the motor vehicle so that the information can be projected correctly onto the windshield even in the event of uneven ground and resulting shaking of the motor vehicle, the depicted information is not incorrectly reproduced. Furthermore, adjustment or alignment of the head-up display itself is required for correctly reproducing information, and installation gauges and methods for setting the head-up display have to be used.

WO 2018/095821 A1 discloses a head-up display with a fastening device, a head-up display and a method for setting the head-up display. The head-up display is fastened to a dashboard of a motor vehicle with the aid of ball-and-socket joints. A ball socket of the ball-and-socket joint is connected nonreleasably to a housing of the head-up display. Thus, the head-up display can be pivoted about a longitudinal axis of the ball-and-socket joint.

A head-up display with a fastening system can be gathered from document WO 2017/009177 A1, wherein pin-shaped centering elements of the head-up display engage in centering openings in the form of elongated holes in a body component. During the adjustment, the centering elements can be displaced in the centering openings in accordance with an extent of the elongated holes.

DE 10 2006 025 386 B4 discloses a head-up display that is fastened to a body component with the aid of a U-shaped holder. The holder is preassembled on the body component before the installation of the head-up display. The assembly of the holder and the body component forms a receiving opening for receiving the head-up display so that the head-up display can be adjusted.

EP 2 420 433 B1 discloses a head-up display that is fastened to a body component via a tolerance compensating part. The tolerance compensating part is connected to the body component in an integrally bonded manner.

DE 10 2016 001 232 A1 discloses a head-up display which is fastened to a body component via a tolerance compensating device that has an electrically actuable mechanical locking device.

Objects of the invention include providing an improved a head-up display of a motor vehicle, an improved fastening system of a head-up display of a motor vehicle, an improved installation gauge for a head-up display of a motor vehicle and an improved gauging method for a head-up display of a motor vehicle.

SUMMARY

A fastening system of a head-up display in accordance with an embodiment of the invention has a housing designed for fastening to a body component of the vehicle. The housing has a housing lower part and a housing upper part. The housing upper part has a cover pane designed for a projection. The fastening system forms a releasable connection both to the housing and to the body component. The fastening system has first passage openings for installation on the housing and second passage openings for installation on the body component. The passage openings may be elongated holes that receive fixing elements, such as pin-shaped fixing elements that are configured to bring about the connection to the housing and to the body component. The releasable connection between the fastening system and the housing enables the housing to be aligned relative to the fastening system, and the releasable connection between the fastening system and the body component enables the housing to be aligned relative to the body component, with the aid of the releasable connection of the fastening system to the body component. Thus, there are multiple positions that can be set for the housing and accordingly for the head-up display. Connections between the fastening system and both the housing and the body component are not released completely during the alignment of the head-up display. Instead, the connection is in the form of a loose or loosened connection.

The connection of the housing and the fastening system and the connection of the body component and the fastening system may be brought about with the aid of fixing elements, such as screws, that are received in the passage openings. The fixing elements may be pin-shaped and may be positioned in the passage openings that may be elongated holes. Pin-shaped fixing elements can be positioned in multiple positions along the extent of passage openings that are elongated holes.

The passage openings may be transverse, in particular orthogonal, to each other in their passage direction to assist in a secured fastening of the housing to the body component is assisted.

The fastening system may comprise first and second holders that are formed separately from each other and are positioned on the housing facing away from each other. Thus, the holders can have simple forms, for example strips with the corresponding receiving openings. The holders can be relatively small, in accordance with a length of the housing wall and can be produced cost-effectively.

The use of screws as the fixing elements contribute to a cost-effective fastening system. Additionally, the holders can be produced from plastic to achieve a fastening system that is reduced in weight. The two holders are arranged on the housing facing away from each other. Thus, tolerance compensation with the aid of the receiving openings in the form of elongated holes can take place simply by displacement. For example, when the elongated holes are designed for receiving what are referred to as M5 screws, a size of the elongated holes of 11×8 mm can be provided. Accordingly, a displacement by approximately 3 mm in the three directions in space is possible.

A second aspect of the invention relates to a head-up display, comprising a housing with a housing lower part and a housing upper part. An optical cover pane is arranged in the housing upper part. The housing may have first receiving elements, such as the above-described receiving elements for fastening to a body component. The head-up display is received securely on the body component with the fastening system that enables the head-up display to be aligned during the installation.

The housing may further have second receiving elements that are designed for receiving an installation gauge. The head-up display therefore can be connected directly to the installation gauge without the interconnection of further means. As a result, an incorrect alignment of the head-up display because of means connected in-between is avoided. A further advantage is that the first receiving elements can be connected to the above-described fastening system so that the head-up display can connected to the fastening system.

The receiving elements may be arranged on the housing lower part since a center of gravity of the head-up display lies in this region. Components for producing an image of information that is projected with the aid of the head-up display onto a windshield of the motor vehicle may be in the housing lower part so that the center of gravity of the head-up display is located in the housing lower part. The housing upper part can be connected releasably to the housing lower part. The disposition of the receiving elements on the housing upper part enables the two housing parts to be separated during the adjustment.

The second receiving elements may face the housing upper part at a higher level in the direction of a vertical axis of the body than the first receiving elements. As a result, the risk of a collision of the installation gauge during attachment to the housing and during the alignment process is avoided.

The first and second receiving elements may differ in shape. As a result, an incorrect accommodating of the fastening system and of the installation gauge on the housing is avoided since they both have different receiving elements.

A simple characterization of the different receiving elements can be realized by forming the first receiving elements or the second receiving elements with a flat outer surface. This can be achieved, for example, by machining.

The head-up display may have reference surfaces for the alignment. The reference surfaces facilitate adjustment and alignment of the head-up display.

A third aspect of the invention relates to an installation gauge for a head-up display that comprises a housing with a housing lower part, a housing upper part and an optical cover pane arranged in the housing upper part. The head-up display is connected to a body component. The installation gauge is designed for receiving the housing at the side walls thereof and may comprise a locking element for receiving the housing transversely with respect to an adjustment movement of the locking element. The locking element may be movable for the adjustment, and the accommodating of the housing with the aid of the locking element takes place transversely, in particular orthogonally, with respect to this movement. Thus, the locking element and the installation gauge do not obstruct the adjustment of the head-up display. The head-up display may be aligned in the direction of the vertical axis of the body. The engagement of the installation gauge on side walls enables the head-up display to be aligned unhindered by the installation gauge.

The adjustment movement of the locking element may a translatory movement that is obtained with the aid of a rotatory movement to achieve exact and infinitesimally small adjustment. The rotatory movement may be a movement of a spindle about its spindle axis, with the spindle receiving the locking element. More particularly, the locking element may be accommodated on a spindle, for example in the form of a screw, that executes a rotational movement about its axis. The locking element, for example with the aid of a thread that surrounds the spindle and is formed on the locking element, can execute a translatory movement in the direction of the vertical axis of the body.

The installation gauge may fastened to the body component and/or to a fastening system of the head-up display with the aid of a securing element to secure the installation gauge during the alignment or adjustment of the head-up display. This can be designed, for example, with the aid of a hook-shaped securing element in such a manner that the installation gauge cannot move in the direction of the vertical axis of the body, but the locking element can.

The installation gauge may comprise the above-described fastening system, and thus may have the above-described advantages of the fastening system.

A fourth aspect of the invention relates to a gauging method for a head-up display that is arranged on a body component of a motor vehicle. Locking elements of an installation gauge may engage on opposite side walls of a housing of the head-up display in receiving elements of the housing. The locking elements may extend in the direction of a transverse axis of the body and may execute a translatory movement in the direction of a vertical axis of the body for the alignment of the housing. The head-up display already fitted in the motor vehicle can therefore be aligned without being restricted or obstructed by the installation gauge itself during the adjustment.

Further advantages, features and details of the invention will become apparent from the following description of preferred exemplary embodiments and with reference to the drawing. The features and combinations of features mentioned above in the description and the features and combinations of features mentioned in the description of the figures below and/or shown only in the figures can be used not only in the respectively indicated combination but also in other combinations or in isolation without departing from the scope of the invention. Identical reference signs are assigned to identical or functionally identical elements.

DETAILED DESCRIPTION

Figure 1:
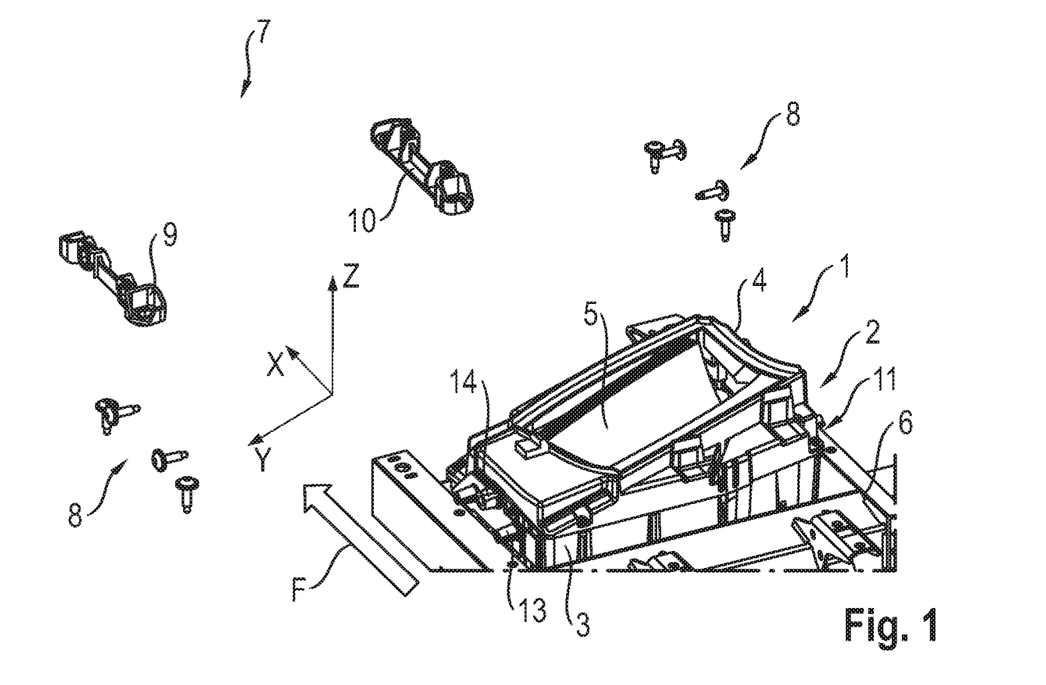
FIG. 1 Is a partially exploded perspective vie of a head-up display according to the invention.

FIG. 1 is a partially exploded perspective illustration of a head-up display 1 according to the invention. The head-up display 1 has a housing 2 with a housing lower part 3 and a housing upper part 4. The housing upper part 4 has a cover pane 5 for the transmissivity of an image brought about with the aid of the head-up display 1.

The head-up display 1 is located in an installation support 6 for the attaching of a fastening system 7 according to the invention. The fastening system 7 first of all is fixed loosely to the housing lower part 3 of the head-up display 1 with the aid of fixing elements 8 of the fastening system 7 that are in the form of screws.

The fastening system 7 comprises a first holder 9 and a second holder 10 that are designed for fastening the head-up display 1 to a body component 11 of a motor vehicle 12, as illustrated, for example, in FIGS. 2 to 4, 9 and 10. The body component 11 is, by way of example, a dashboard frame of the motor vehicle 12. A direction of movement associated with a corresponding installation step of the relevant components is depicted as an installation direction 39 illustrated in the form of an arrow. The direction of travel of the motor vehicle is identified by a travel arrow F.

The fastening system 7 is constructed to form a releasable connection both with the housing 2 and with the body component 11 and is not connected to either of the two in a nonreleasable manner.

The head-up display 1 extends in the direction of a longitudinal axis X of the body, in the direction of a transverse axis Y of the body and in the direction of a vertical axis Z of the body.

First receiving elements 13 are formed on the housing lower part 3 for receiving the fixing elements 8 that extend in the direction of the transverse axis Y of the body. The illustrated embodiment of first receiving elements 13 are conical sleeves with a hole for receiving the fixing elements 8 that are connected fixedly to the housing lower part 3.

Furthermore, second receiving elements 14 are formed on the housing lower part 3 for receiving an installation gauge 15 as illustrated in FIGS. 9 to 12. The second receiving elements 14 also are in the form of sleeves and are arranged on the housing lower part 3 above the first receiving elements 13 in a manner facing the housing upper part 4 in the direction of the vertical axis Z of the body.

The receiving elements 13, 14 are provided on mutually averted side walls 43 of the housing 2.

Figure 2:
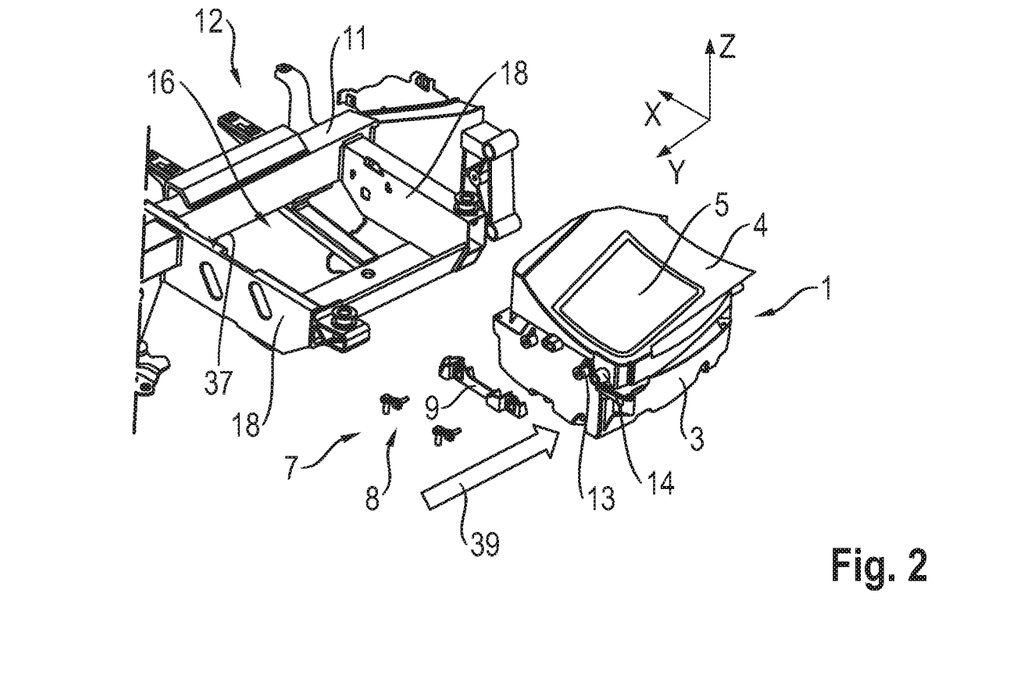
FIG. 2 is a perspective illustration of the head-up display in a first installation step.
Figure 5:
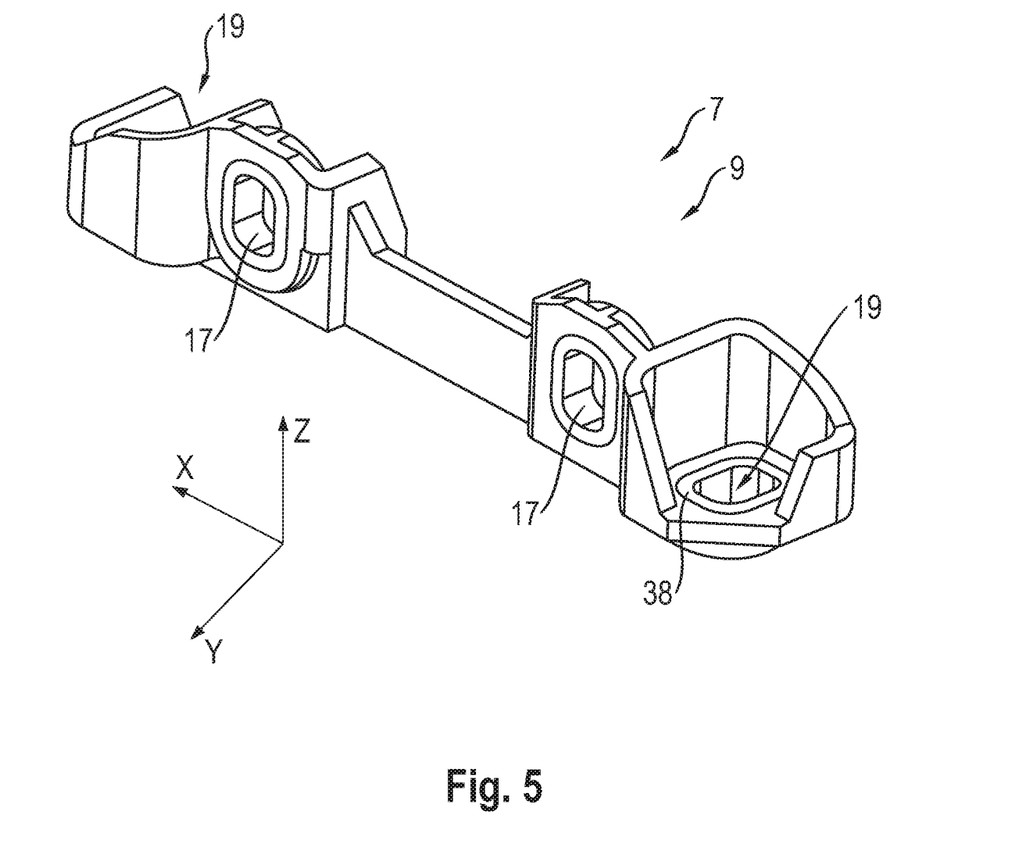
FIG. 5 is a perspective illustration of a holder of a fastening system according to the invention of the head-up display of FIG. 1.

The head-up display 1 is accommodated on the body component 11 by initially connecting the first and second supports 9 and 10 to the first receiving elements 13 with the aid of the fixing elements 8 that extend in the direction of the transverse axis Y of the body, as illustrated in FIG. 2, which depicts the head-up display 1 in a first installation step. For this purpose, the supports 9, 10 have first passage openings 17 extending in the direction of the vertical axis Z of the body and the longitudinal axis X of the body for receiving the fixing elements 8, as shown in FIG. 5, which is a perspective illustration of the first holder 9. The passage direction of the first passage openings 17 is oriented in the direction of the transverse axis Y of the body. In the first installation step, and the fastening system 7 therefore is connected to the head-up display 1. The first passage openings 17 are larger in the direction of the vertical axis Z of the body than in the direction of the longitudinal axis X of the body and therefore define an elongated hole.

Figure 3:
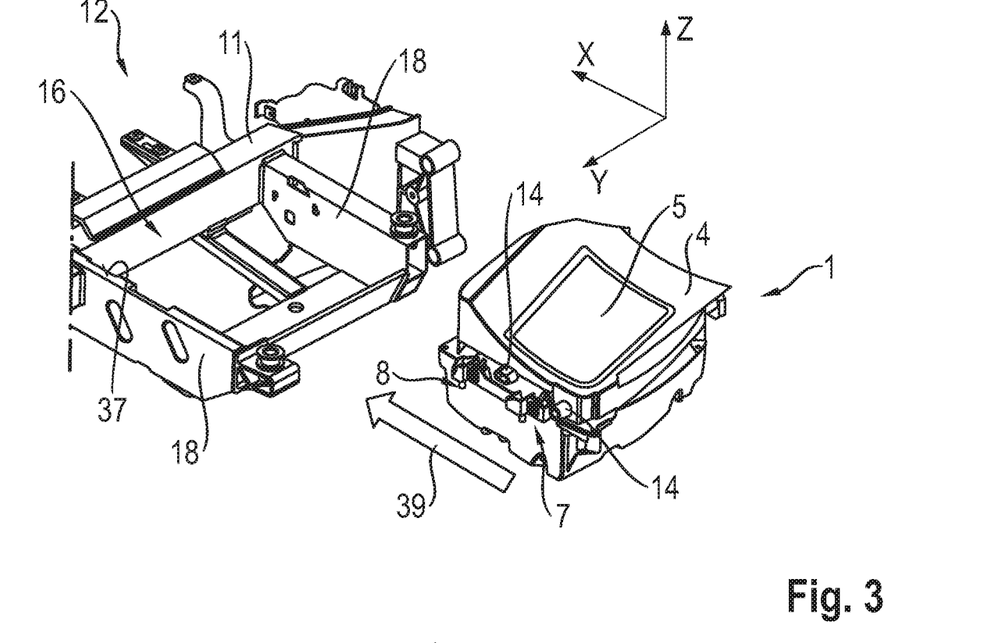
FIG. 3 is a perspective illustration of the head-up display in a second installation step.

FIG. 3 illustrates a second installation step where the head-up display 1, which has been connected to the fastening system 7, is placed into a receiving opening 16 in the body component 11. More particularly, the holders 9, 10 are placed onto a frame cross member 18 of the body component 11 that is arranged to face the holders 9, 10, and the holders 9, 10 and frame cross member 18 are connected fixedly in a fourth installation step with the aid of fixing elements 8 extending in the direction of the vertical axis Z of the body. The holder 9; 10 has a second passage opening 19 oriented in the direction of the vertical axis Z of the body, and the second passage opening 19 receives the fixing elements 8 that also extend in the direction of the vertical axis Z of the body. The second passage openings 19 are larger in the direction of the transverse axis Y of the body than in the direction of the longitudinal axis X of the body, and therefore have a shape equivalent to an elongated hole.

The passage openings 17, 19 of the fastening system 7 are oriented transversely, in particular orthogonally, with respect to each other and enable a three-dimensional movement of the head-up display 1 in space.

Figure 4:
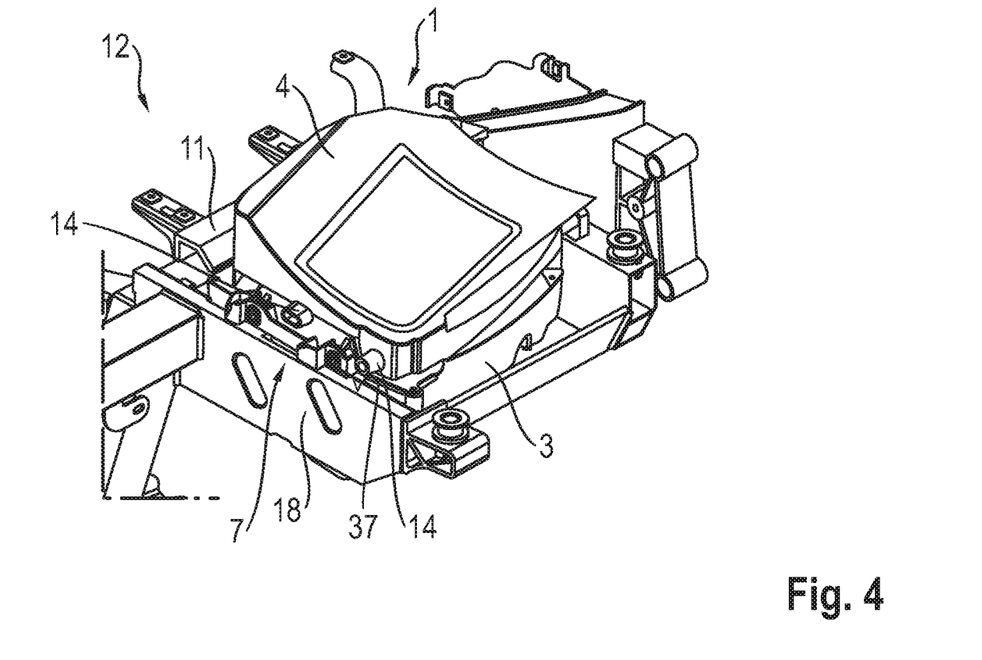
FIG. 4 is a perspective illustration of the head-up display after a third installation step.
Figure 11:
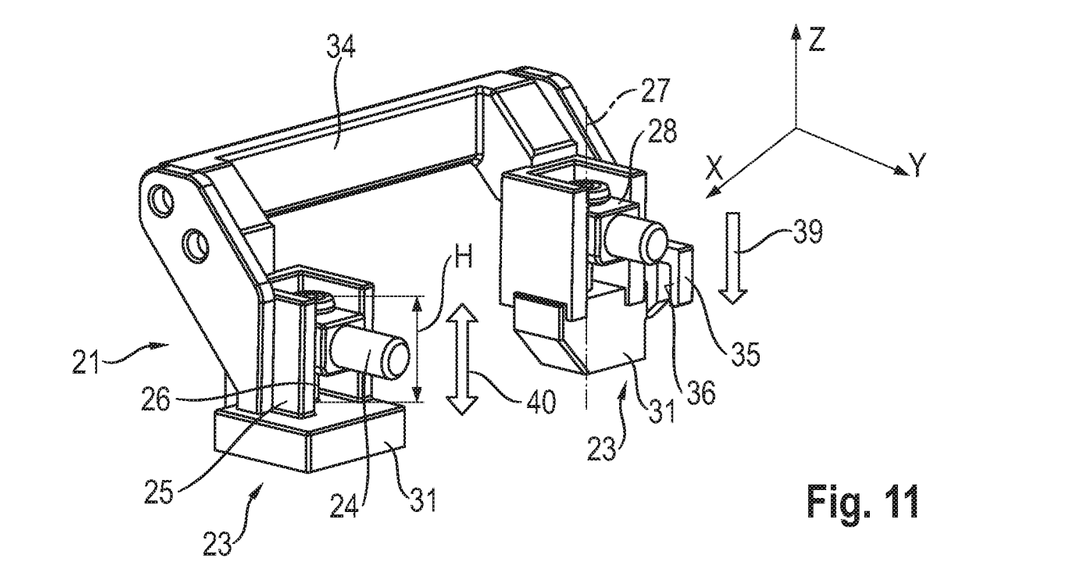
FIG. 11 is a perspective illustration of a first gauge part of the installation gauge.
Figure 12:
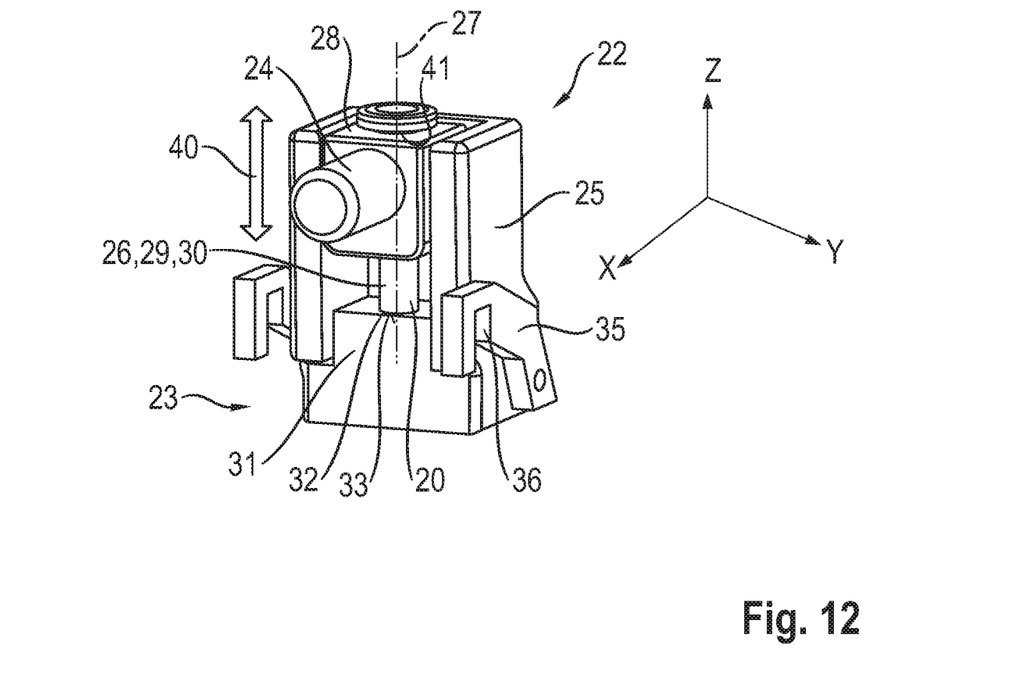
FIG. 12 is a perspective illustration of a second gauge part of the installation gauge.

With the aid of the fastening system 7 according to the invention, the head-up display 1 is fixed, after the third installation step, on the body component 11, in particular on the frame cross members 18 thereof, see FIG. 4, but now has to be aligned or adjusted and set, for the correct projection of the head-up display 1, for example, onto a windshield of the motor vehicle 12. This takes place with the aid of the installation gauge 15 that is illustrated in FIGS. 11 and 12.

Figure 6:
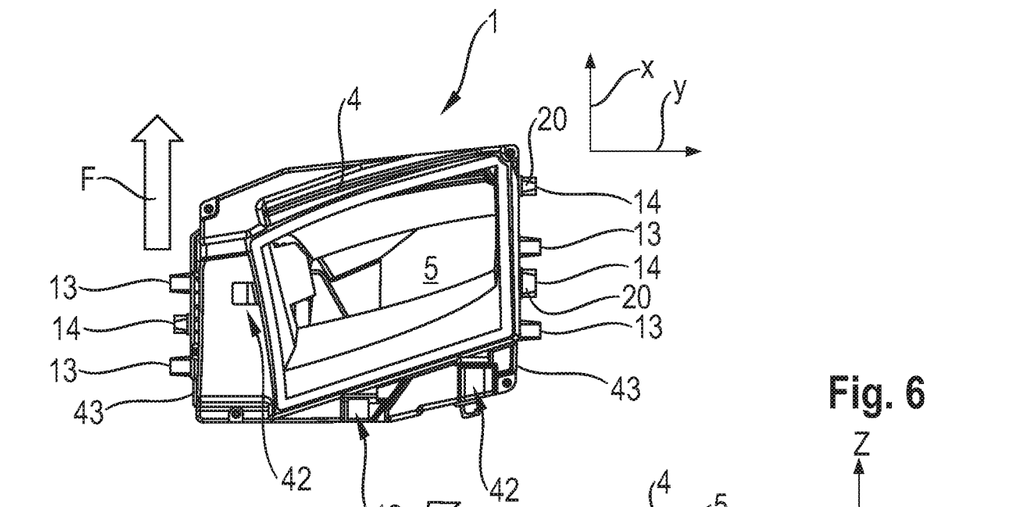
FIG. 6 is a top view of the head-up display of FIG. 1.
Figure 7:
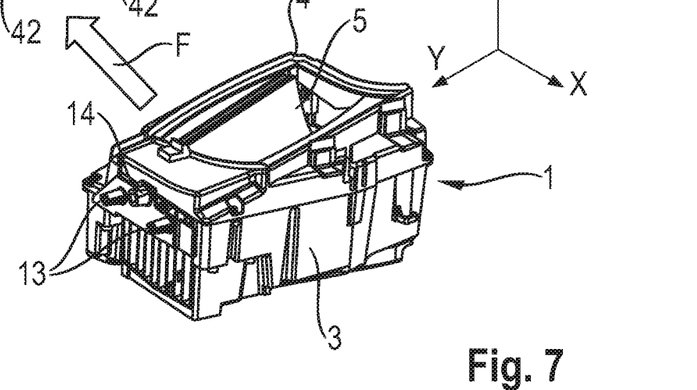
FIG. 7 is a perspective illustration of the head-up display of FIG. 6.
Figure 8:
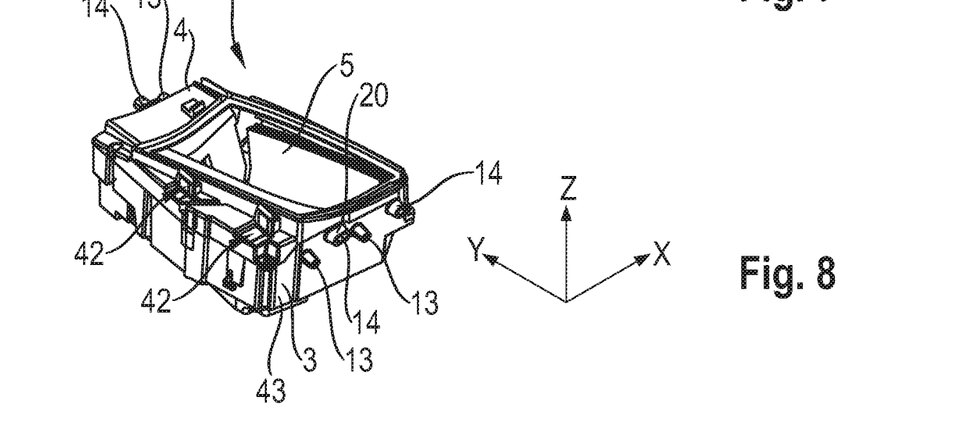
FIG. 8 is a further perspective illustration of the head-up display of FIG. 6.

FIGS. 6 to 8 additionally illustrate the head-up display 1 in different views.

The receiving elements 13, 14 used for different accommodation purposes differ in shape to avoid confusion. In the illustrated embodiment, outer surfaces of the second receiving elements 14 are machined to form flat surfaces 20 extending in the direction of the longitudinal axis X of the body and the transverse axis Y of the body.

Figure 9:
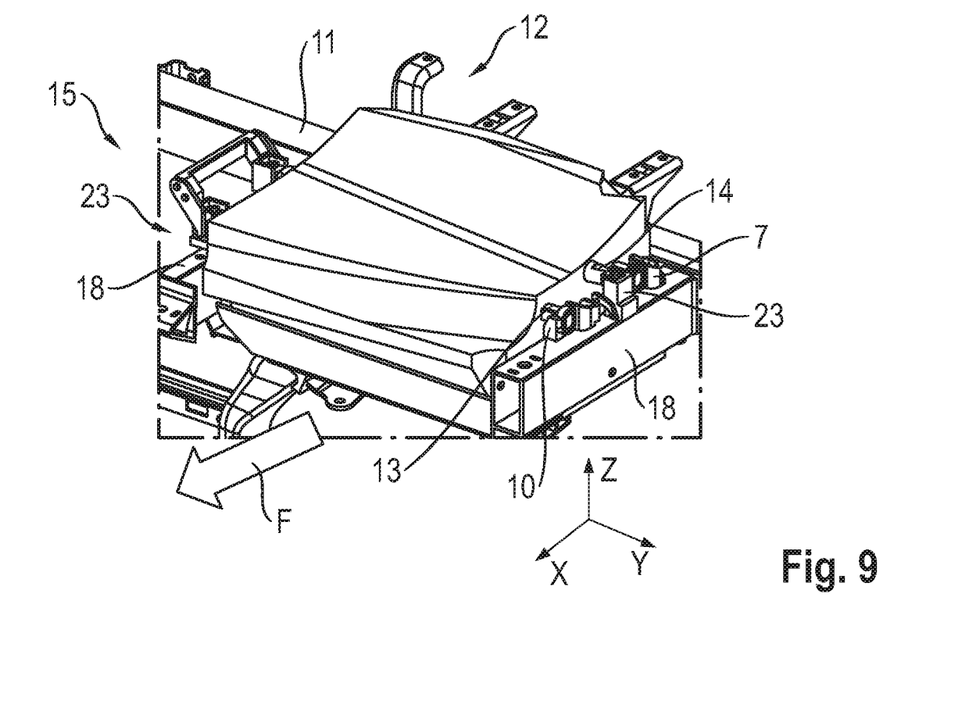
FIG. 9 is a perspective illustration of the head-up display with an installation gauge according to the invention.
Figure 10:
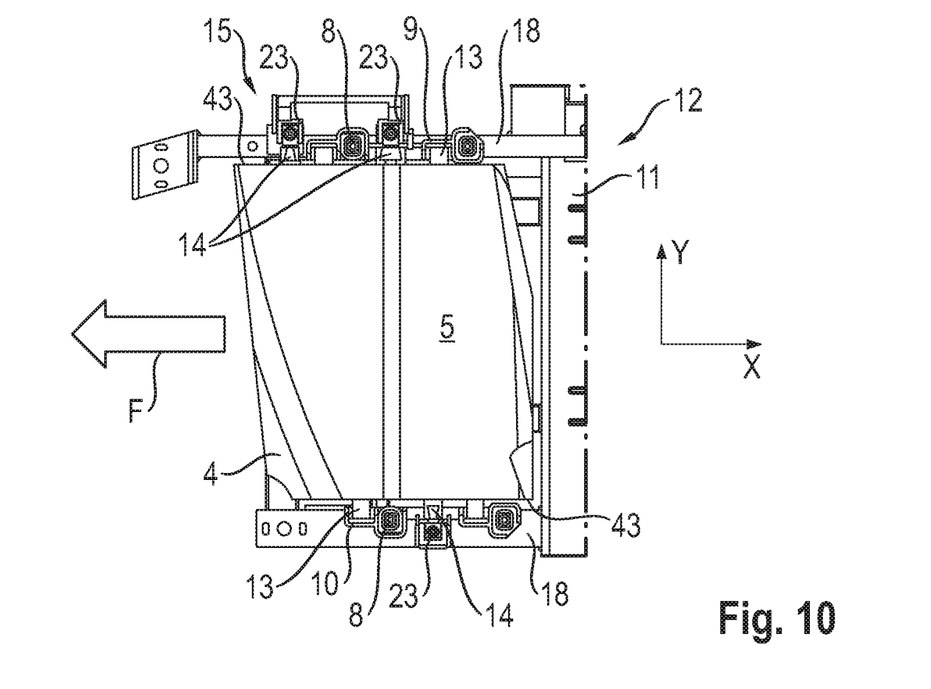
FIG. 10 is a top view of the head-up display of FIG. 9.

The second receiving elements 14 are designed for fixing the installation gauge 15. The installation gauge 15 comprises a first gauge part 21 and a second gauge part 22 that are opposite each other and separately from each other on the housing lower part 3.

An operative part 23 of the installation gauge 15 is designed for bringing about a movement of the head-up display 1 in the direction of the vertical axis Z of the body. The operative part 23 comprises a locking element 24 in the form of a locking pin accommodated in an element housing 25 so as to be movable in the direction of the vertical axis Z of the body. Thus, the operative part may be designed to be able to execute a translational movement brought about with the aid of a rotational movement of a spindle 26 about its spindle axis 27. For this purpose, the locking pin 24, extends in the direction of the transverse axis Y of the body, is arranged on a support 28 in the form of a cube that is guided in the element housing 25 and is designed to be movable in the direction of the vertical axis Z of the body.

The cube 28 is connected to the spindle 26 that is rotatable about its spindle axis 27 relative to the cube 28. The cube 28 is locked to the spindle 26 in the direction of the vertical axis Z of the body. Thus, the spindle 26 can rotate about its spindle axis 27 in an opening 41 formed in the cube 28 while the cube 28 remains identically positioned in its orientation relating to the longitudinal and transverse axes X, Y of the body since it is guided in the element housing 25. Thus, an interlocking connection to the element housing 25 is formed in the direction of the longitudinal and transverse axes X, Y of the body.

The spindle 26 is designed to be variable in its height H in the direction of the vertical axis Z of the body in the element housing 25. This vertical movement is realized with the aid of a thread 29 on an outer surface 30 of the spindle 26. The element housing 25 has a housing foot 31 receiving the spindle 26 and a receiving opening 32 having an inner surface 33 formed in a complementary manner with respect to the outer surface 30 of the spindle 26. A translational movement of the cube 28 and of the locking pin 24 that is connected fixedly to the cube 28 can be brought about by a rotational movement of the spindle 26.

In a further embodiment of the installation gauge, the spindle 26 is in the form of a screw, and the cube 28 has an inner surface of the opening 41. This inner surface is designed in a complementary manner with respect to the screw thread. Thus, during a rotation of the spindle 26 in one direction, for example, the cube 28 together with the locking pin 24 is displaced in the direction of the housing foot 31 and, during a rotation of the spindle 26 in the opposite direction, the cube 28 together with the locking pin is displaced in the direction facing away from the housing foot 31.

The first gauge 21 has two operative parts 40 that are connected for joint positioning with the aid of a connecting element 34 of U-shaped design. The operative parts are arranged at one end each of the connecting element 34. The first gauge part 21 has two securing elements 35 for securing the first gauge part 21 on the frame cross member 18 during the alignment of the head-up display 1.

The second gauge part 22 has a single operative part 40, is to be secured on the frame cross member 18 with the aid of likewise two securing elements 35.

The securing element 35 has an inner contour 36 designed to match an outer contour 37 of the frame cross member 18 so that an interlocking connection is realized to avoid movements during the alignment process.

The supports 9, 10 of the fastening systems 7 can be manufactured cost-effectively from a plastic. For stability reasons, it is recommended to provide the passage openings 17, 19 with a material having low wear. This can be undertaken, for example, in the form of a metal sleeve 38 inserted as early as in, for example, a diecasting method during the production of the support 9; 10 and is fixedly connected thereto.

The housing upper part 4 of the head-up display 1 has at least three reference surfaces 42 for measuring the positioning of the head-up display 1. The three reference surfaces 42 orthogonal to one another and are formed on the housing upper part 4 in planes belonging respectively to the body axes X, Y, Z.

The head-up display 1 after being positioned in the receiving opening 16 and after being connected to the body component 11 is adjusted with the aid of a gauging method according to the invention.

The gauging method is distinguished in that, when the head-up display 1 is connected to the body component 11, the installation gauge 15 is connected in an engaging manner to the housing 2. The second receiving elements 14 are formed on the opposite side walls 43 and serve for receiving the locking pins 24 of the installation gauge 15 and the locking pins 24 are displaced up and/or down in the direction of the longitudinal axis Z of the body by the rotational movement of the spindles 26 that are designed to receive the locking pins 24 in a supporting manner.

Prior to the use of the gauging method, the following installation steps can be carried out for the arrangement of the head-up display 1:
  mounting the fastening system 7 on the housing lower part 3 of the head-up display 1, with the first receiving elements 13 receiving the fixing elements 8 that extend in the direction of the transverse axis Y of the body for fastening the holders 9, 10 with the aid of the first passage openings 17,
  placing the head-up display 1, which is connected to the fastening system 7, into a receiving opening 18 of the body component 11 so that the holders 9, 10 are supported in a manner resting on the frame cross members 18,
  positioning the fixing elements 8, which extend in the direction of the vertical axis Z of the body, in the second passage openings 19 and connecting the fixing elements 8 to the frame cross member 18 with the aid of an interlocking and force-fitting connection.

What is claimed is:

1. A fastening system of a head-up display, wherein the head-up display has a housing with a housing lower part and a housing upper part, wherein the housing upper part has a cover pane designed for a projection and wherein the housing is designed for fastening to a body component, the fastening system forming a releasable connection both to the housing and to the body component, the fastening system having first passage openings for installation on a housing of the head-up display and second passage openings for the installation on a body component, the first and second passage openings being elongated holes configured for receiving pin-shaped fixing elements for connection to the housing and to the body component.

2. The fastening system of claim 1, wherein the first and second passage openings are formed respectively with first and second passage directions, the first passage directions being transverse to the second passage directions.

3. The fastening system of claim 1, further comprising a first holder (9) and a second holder that are formed separately from each other and can be positioned facing away from each other on the housing.

4. A head-up display, comprising both the housing and the fastening system of claim 1, wherein the housing has a housing lower part, a housing upper part, an optical cover pane arranged in the housing upper part, and first receiving elements for fastening to the body component, the first receiving elements being designed for receiving the fastening system.

5. A head-up display, comprising: a housing with a housing lower part, a housing upper part and an optical cover pane arranged in the housing upper part, the housing having first receiving sleeves projecting from the housing lower part and formed respectively with holes extending into the first receiving sleeves along a projecting direction of the respective first receiving sleeve and configured for receiving first fastening elements for fastening the housing lower part to a body component of a motor vehicle and second receiving sleeves projecting from the housing lower part at a higher level along a vertical axis of the body than the first receiving elements, the second receiving sleeves being configured for receiving an installation gauge.

6. The head-up display of claim 5, wherein the first receiving elements and the second receiving elements differ in shape.

7. The head-up display of claim 6, wherein the second receiving elements have a flat surface.

8. The head-up display of claim 7, wherein the head-up display has reference surfaces for the alignment.

9. An installation gauge for a head-up display, the head-up display has a housing with a housing lower part, a housing upper part and an optical cover pane arranged in the housing upper part, the head-up display being connectable to a body component of a vehicle and being adjustable via the installation gauge, the installation gauge being configured for receiving the housing at side walls of the housing, the installation gauge comprising a locking element being configured for receiving the housing transversely with respect to an adjustment movement of the locking element.

10. The installation gauge of claim 9, wherein the adjustment movement of the locking element is a translational movement that is obtained via a rotational movement.

11. The installation gauge of claim 10, wherein the rotational movement is a movement of a spindle about its spindle axis, the spindle receiving the locking element (24).

12. The installation gauge of claim 9, further comprising a securing element that fastens the installation gauge to at least one of the body component and a fastening system of the head-up display.

13. The installation gauge of claim 12, wherein the fastening system has first passage openings for installation on the housing and second passage openings for the installation on the body component, the first and second passage openings being elongated holes configured for receiving pin-shaped fixing elements for connection to the housing and to the body component.

14. A gauging method for a head-up display, wherein the head-up display is arranged in a body component of a motor vehicle, and wherein locking elements of an installation gauge engage on opposite side walls of a housing of the head-up display in receiving elements of the housing, and wherein, for the alignment of the housing, the locking elements extending in the direction of a transverse axis of the body execute a translation movement along a vertical axis of the body.

15. The gauging method of claim 14, wherein the translation movement is brought about with the aid of a rotational movement.

16. The gauging method of claim 15, wherein the rotational movement is brought about with the aid of a spindle about its spindle axis, the spindle receiving the locking element that is connected to the spindle so as to be immovable parallel to the vertical axis of the body.

17. The gauging method of claim 16, wherein the installation gauge is supportable on the body component.

* * * * *